United States Patent Office 3,158,642
Patented Nov. 24, 1964

3,158,642
PHOSPHINE OXIDE POLYMERS
Earl C. Chapin and Albert Y. Garner, Springfield, Mass., assignors to Monsanto Company, a corporation of Delaware
No Drawing. Filed Mar. 15, 1961, Ser. No. 95,814
1 Claim. (Cl. 260—465)

This invention relates to novel phosphorous containing resins. More particularly, it relates to phosphine oxide polymers and a process for their preparation.

In copending application S.N. 53,921, filed September 6, 1960, are described novel phosphine oxide polymers corresponding to the general formula:

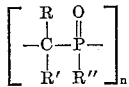

wherein R and R' are independently selected radicals taken from the group consisting of hydrogen and hydrocarbon radicals free of ethylenic and acetylenic unsaturation, R'' is a hydrocarbon radical containing from 1 to 10 carbon atoms and free of ethylenic and acetylenic unsaturation and $n$ is an integer of from 10 to 10,000. The process set forth in said application, for the preparation of these polymers, requires the reaction of a halophosphine corresponding to the general formula:

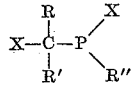

with a monohydric organic compound such as, e.g., alcohol or phenol, to form the corresponding halophosphinite and the subsequent heating of the product thereof to induce polymerization.

The halophosphines employed as raw materials in that process are relatively unavailable and are costly to prepare.

Accordingly, it is an object of this invention to provide a novel process for the preparation of phosphine oxide polymers.

Another object of this invention is to provide new and useful phosphine oxide polymers containing reactive sites.

These and other objects are attained by reacting, in substantially equimolar proportion, a primary phosphine having the general formula:

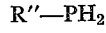

and an acetylenically unsaturated compound having the general formula:

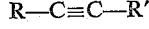

and thereafter oxidizing the product of said reaction. The phosphine oxide polymers obtained in this manner correspond to the general formula:

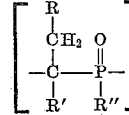

In the above formulae, R'' is a 1 to 10 carbon atom hydrocarbon radical free of ethylenic and acetylenic unsaturation, R and R' are independently selected radicals taken from the group consisting of hydrogen, 1 to 10 carbon hydrocarbon radicals free of ethylenic and acetylenic unsaturation, and hydroxymethyl, cyanomethyl, cyano and carboxyl radicals, and $n$ is an integer of from 5 to 5,000.

The following examples are given in illustration of the invention and are not intended as limitations thereon.

*Example I*

Twenty-two grams (about 0.2 mol) of phenylphosphine, 20 grams (about 0.2 mol) of phenylacetylene and 0.1 ml. of ditertiarybutyl peroxide are charged to a 300 ml. stainless steel autoclave and placed under a nitrogen atmosphere. The reaction mixture is heated at about 120° C. for 72 hours and then is cooled to room temperature. The light yellow, viscous reaction product is dissolved in 150 ml. of benzene and the resulting solution is then poured into an excess of hexane to precipitate about 20 grams of a light yellow, hard, brittle polymer which is found to be soluble in acetone and benzene but insoluble in methanol. The polymer recovery is carried out in the presence of air. Infrared spectroscopy and elemental analysis show the polymer to be comprised of a plurality of structural units corresponding to the formula:

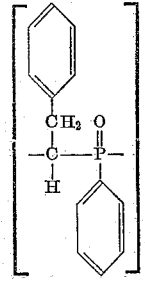

*Example II*

Forty-five grams (about 0.5 mol) of phenylphosphine, 28 grams (about 0.5 mol) of propargyl alcohol, 150 ml. of benzene and 0.5 ml. of ditertiarybutyl peroxide are charged to a 300 ml. stainless steel autoclave and placed under a nitrogen atmosphere. The reaction mixture is heated at about 100° C. for 40 hours and then is cooled to room temperature. Upon standing for several minutes, the reaction mixture separates into two liquid phases. The upper, benzene, phase is decanted, leaving a viscous fluid. This viscous fluid is dissolved in 150 ml. of methanol and the resulting solution is then poured into an excess of water to yield, after drying, about 15 grams of a light yellow, hard, brittle polymer which is found to be soluble in methanol but insoluble in benzene. The polymer recovery is carried out in the presence of air. Infrared spectroscopy and elemental analysis show the polymer to be comprised of a plurality of structural units corresponding to the formula:

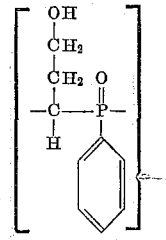

Example III

Example II is repeated substituting 25 grams (about 0.5 mol) of propargyl nitrile for the propargyl alcohol employed therein. The product is a light brown, hard, brittle polymer which is found to be soluble in benzene, acetone and chloroform but insoluble in ether and petroleum ether. Infrared spectroscopy and elemental analysis show the polymer to be comprised of a plurality of structural units corresponding to the formula:

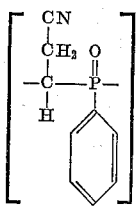

Example IV

Example II is repeated substituting 35 grams (about 0.5 mol) of propiolic acid for the propargyl alcohol employed therein. The product is a substantially colorless, hard, brittle polymer. Infrared spectroscopy and elemental analysis show the polymer to be comprised of a plurality of structural units corresponding to the formula:

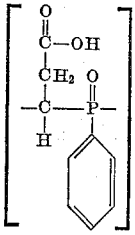

Example V

Twenty-two grams (about 0.5 mol) of phenylphosphine, 150 ml. of benzene and 0.2 gram of azo-bis-isobutyronitrile are charged to a 300 ml. stainless steel autoclave and placed under a nitrogen atmosphere. Thirteen grams of acetylene are introduced into the autoclave under pressure and the reaction mixture is then heated at about 80° C. for 36 hours. After cooling to room temperature, the viscous polymeric solution is poured into an excess of hexane to precipitate a substantially colorless, hard, brittle polymer. This final polymer recovery step is carried out in the presence of air. Infrared spectroscopy and elemental analysis show the polymer to be comprised of a plurality of structural units corresponding to the formula:

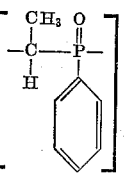

Example VI

Example I is repeated substituting 18 grams (about 0.2 mol) of n-butylphosphine employed therein. The product is a hard, brittle polymer which infrared spectroscopy and elemental analysis establish as being comprised of a plurality of structural units corresponding to the formula:

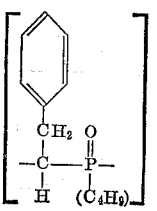

The primary phosphines employed in the practice of this invention correspond to the general formula:

$$R''-PH_2$$

wherein R'' is a hydrocarbon radical free of ethylenic and acetylenic unsaturation. Those alkyl, cycloalkyl, aryl, aralkyl and alkaryl hydrocarbons containing from 1 to 10 carbon atoms are within the scope of this invention. For example, the n-butylphosphine and the phenylphosphine employed in the examples may be replaced by methylphosphine, ethylphosphine, n-propylphosphine, isopropylphosphine, tertiarybutylphosphine, hexylphosphine, cyclohexylphosphine, isooctylphosphine, decylphosphine, para - toluylphosphine, phenylmethylphosphine, etc., with equivalent results. Mixtures of such compounds may also be employed.

The acetylenically unsaturated compounds employed in the practice of this invention correspond to the general formula:

$$R-C\equiv C-R'$$

wherein R and R' are independently selected radicals taken from the group consisting of hydrogen, 1 to 10 carbon atom hydrocarbon radicals free of ethylenic and acetylenic unsaturation, and hydroxy methyl, cyano, cyanomethyl and carboxyl radicals. For example, the acetylene, the phenylacetylene, the propargyl alcohol, the propargyl nitrile and the propiolic acid employed in the examples may be replaced by methylacetylene, dimethylacetylene, isopropylacetylene, hexylacetylene, cyclohexyacetylene, decylacetylene, 1-methyl-2-hexylacetylene, 1-methyl-2-phenylacetylene, 1-hexyl-2-phenylacetylene, diphenylacetylene, 1,4-dihydroxy-butyne-2, 1,4-dicyanobutyne-2, 1-phenyl-2-hydroxymethylacetylene, 1-n-butyl-2-hydroxymethylacetylene, 1-phenyl-2-cyanomethylacetylene, tetrolic acid, 1-cyano-4-hydroxy-butyne-2, etc., with equivalent results.

The subject phosphine oxide polymers are prepared by co-reacting substantially equimolar proportions of one or more of the foregoing primary phosphines with one or more of the foregoing acetylenically unsaturated compounds in the substantial absence of oxygen, employing an inert, e.g., nitrogen atmosphere, and subsequently exposing the resulting phosphine polymer to an oxygen source whereupon the phosphine groups are susbtantially completely oxidized to phosphine oxide groups.

The reaction of the primary phosphine with the acetylenically unsaturated compound proceeds by a free radical mechanism; the free radicals being generated from the reactants themselves under the influence of heat or irradiation with, for example, actinic light, X-rays, atomic radiation, etc. or by free radical generating compounds charged to the reaction mixture. Temperature is a factor only as regards the generation of free radicals in the absence of irradiation. In such instances, polymerization temperatures within the activation temperature range of the particular free radical source employed should be used. As herein employed the term "activation temperature" relates to the temperature at which the free radical generating compound decomposes at a rate such that it has a half-life of less than 100 hours, and more preferably, less than 20 hours. Conventional free radical initiators may be employed in concentrations of up to about 5% by weight, based upon the total weight of the reactants. These include, for example, peroxides such as dibenzoyl peroxide, ditertiarybutyl peroxide, etc., and azo compounds such as azo-bis-isobutyronitrile.

Although the use of a solvent is not normally required, it may be advantageous in certain instances to effect the reaction of the primary phosphine with the acetylenically unsaturated compound in an inert organic solvent to provide increased mobility of the reactive sites and the attainment of high yields. The use of such a solvent becomes preferred when either the primary phosphine or the acetylenically unsaturated compound, or both, are gaseous under the reaction conditions employed. Suitable solvents include, for example, benzene, methanol, dioxane, tetrahydrofurane, toluene, etc.

The product obtained from the coreaction of the above-described primary phosphine and acetylenically unsaturated compounds are phosphine polymers corresponding to the general formula:

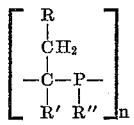

wherein R, R' and R'' are radicals as hereinbefore described and $n$ is an integer of from 5 to 5,000. These polymers are readily oxidized to the corresponding polymeric phosphine oxides. This may be accomplished simply by exposing them to air. Alternatively, a conventional oxidizing agent may be employed. The resulting phosphine oxide polymers are highly stable and comprise the desired products of this invention.

Since oxidation occurs during isolation effecting an increase in polarity of the polymer, its solubility characteristics may change, i.e., it may initially be soluble in nonpolar solvents but after isolation and oxidation it is soluble only in polar solvents.

Conventional techniques may be employed in recovering the polymer from the reaction mixture. If a solvent is employed, the polymer can be recovered by precipitation in a nonsolvent. The solvent can also be removed by evaporation or distillation. If a solvent is not used, or if it has already been removed, the polymer may be further refined by solution in a solvent followed by precipitation in a nonsolvent.

The phosphine oxide polymers obtained are comprised of a plurality of structural units corresponding to the general formula:

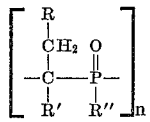

wherein R, R' and R'' are radicals as hereinbefore disclosed. The degree of polymerization, $n$, of these polymers is from about 5 to 5,000.

The lower molecular weight phosphine oxide polymers are fluids at room temperature whereas those of higher molecular weight melt at elevated temperatures. Among the many obvious uses for these resins, they are particularly useful as surface coating intermediates, textile sizing, laminating adhesives for wood, glass, metal, etc. Those phosphine oxide polymers containing reactive nitrile, hydroxyl or acid groups may serve as polymeric intermediates or may be cross-linked using poly-functional compositions such as di-isocyanates, urea or melamine resins, diacid chlorides, etc., or may be esterified with, e.g., drying oil fatty acids or fatty alcohols to form surface coating compositions.

*Example VII*

A mixture of 7 grams of the polymer of Example II and 3 grams of soybean fatty acids are heated, with stirring, at a temperature of about 260° C. for 4 hours. The resulting polymeric fatty acid ester is cooled to room temperature and dissolved in 10 ml. of a 1:1 by weight xylene-butanol mixture. A uniform 0.005″-thick film of this solution is cast on the surface of a clean, stainless steel plate. After drying the coated plate in a hot-air oven at 150° C. for about 1 hour, the resultant film is observed to be hard, clear and resistant to attack by water, 5% caustic solution, benzene and hydrocarbon solvents. Upon holding the coated surface of the steel plate in the flame of a Meeker burner until the film ignites and thereupon removing the steel plate from the flame, the film ceases to burn indicating it to be self-extinguishing.

*Example VIII*

About 10 grams of the polymer of Example I are melted under heat, combined with 1 gram of a diglycidyl ether of bisphenol-A and the mixture is then poured evenly onto the surface of a clean stainless steel plate. A second stainless steel plate is placed on top and the resulting sandwich is pressed at about 50 p.s.i. while cooling to room temperature. The resulting laminate is resistant to common solvents and remains intact even after a 10-minute immersion in boiling water.

These phosphine oxide polymers may be employed per se or they may be modified by the incorporation therein of conventional additives such as plasticizers, dyes, pigments, etc. They may also be used in combination with other resins, e.g., alkyd resins, vinyl and vinylidene polymers, diene polymers, aminoplast resins such as melamine-formaldehyde and urea-formaldehyde resins, etc.

It is obvious that many variations may be made in the products and processes of this invention without departing from the spirit and scope thereof.

What is claimed is:

As a composition of matter, a phosphine oxide polymer corresponding to the general formula:

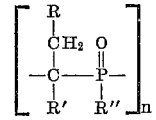

wherein R'' is a hydrocarbon radical free of ethylenic and acetylenic unsaturation containing from 1 to 10 carbon atoms, $n$ is an integer of from 5 to 5,000, and R and R' are radicals independently selected from the group consisting of hydrogen, hydrocarbon radicals free of ethylenic and acetylenic unsaturation containing from 1 to 10 carbon atoms, and hydroxymethyl, cyanomethyl, cyano and carboxyl radicals; at least one of said R and R' radicals being selected from the group consisting of said hydroxymethyl, cyanomethyl, cyano and carboxyl radicals.

References Cited in the file of this patent

UNITED STATES PATENTS 2,957,931     Hamilton et al. _____ Oct. 25, 1960

OTHER REFERENCES

Kosolapoff: "Organo-Phosphorus Compounds," John Wiley & Sons (1950), p. 98.

UNITED STATES PATENT OFFICE
CERTIFICATE OF CORRECTION

Patent No. 3,158,642                                    November 24, 1964

Earl C. Chapin et al.

It is hereby certified that error appears in the above numbered patent requiring correction and that the said Letters Patent should read as corrected below.

Column 2, line 38, for "Forty-five" read -- Fifty-five --; column 3, line 63, after "n-butylphosphine" insert -- for the phenylphosphine --.

Signed and sealed this 13th day of April 1965.

(SEAL)
Attest:

ERNEST W. SWIDER                                    EDWARD J. BRENNER
Attesting Officer                                       Commissioner of Patents